3,379,892
PHOTOELECTRIC CONTROLLER HAVING A SHUTTER WHICH IS ANGULARLY MOVABLE FROM OUTSIDE THE ENCLOSURE FOR ADJUSTING SENSITIVITY
Philip A. Neagle, Braintree, Mass., assignor to Sigma Instruments, Inc., South Braintree, Mass., a corporation of Massachusetts
Filed Jan. 12, 1965, Ser. No. 425,016
10 Claims. (Cl. 250—237)

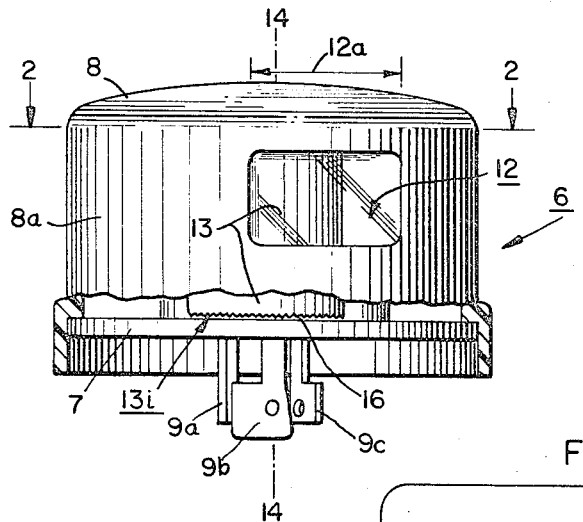
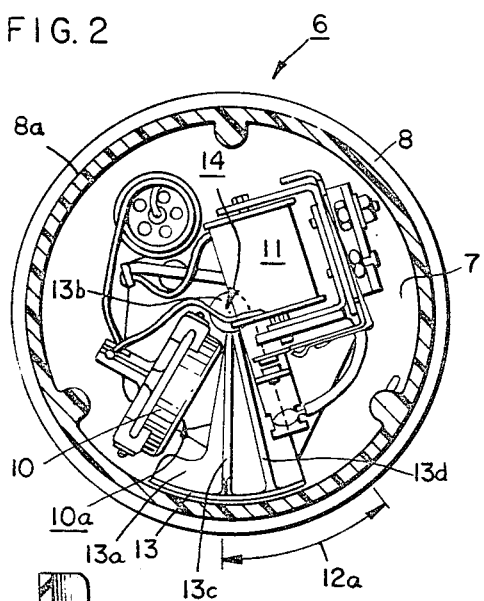
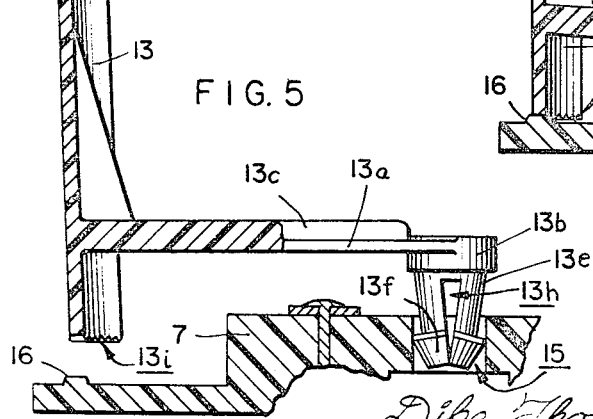
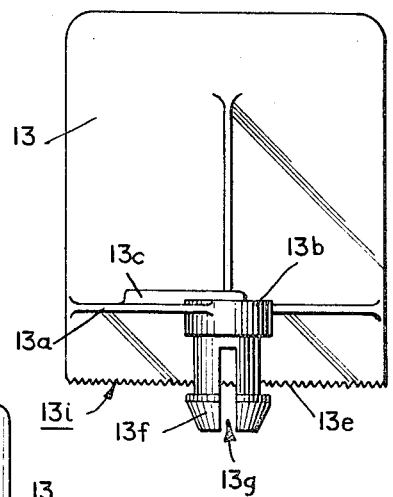
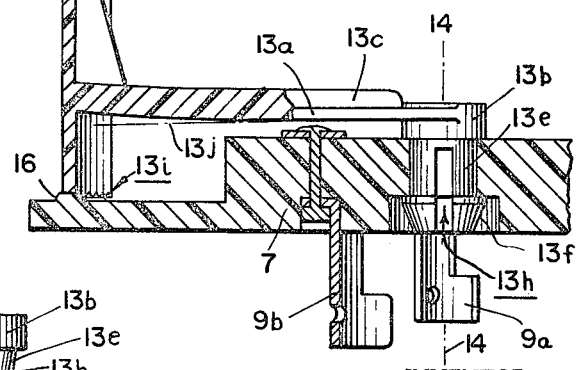
INVENTOR.
PHILIP A. NEAGLE
BY
Dike, Thompson, Bronstein & Mrose
ATTORNEYS United States Patent Office 3,379,892
Patented Apr. 23, 1968

The present invention relates to improvements in the optical regulation of photoelectric controllers, and, in one particular aspect, to novel and improved angularly-adjustable shutter arrangements, for the light-admitting apertures of streetlight and like control units, which may be economically manufactured, installed and adjusted, and which achieve important reductions in numbers of parts and in space requirements.

Light-responsive controllers, such as those which are now widely used for the automatic on-site switching of street lights, commonly include as basic elements a photocell and an associated electrical relay, and, for known purposes, it may also be required that these elements be in circuit relationship with other components, such as impedances, lightning arrestors, and the like. These associated parts are conveniently packaged together, for plug-in connection with supply and controlled electrical circuits, within a windowed opaque housing which permits ambient illumination from certain directions to impinge upon the enclosed photocell. Depending upon such factors as the tolerances in electrical characteristics of the assembled parts, and the intended environmental conditions of end use, it often is necessary that different units which are otherwise of identical construction be adjustable in their responses to illumination. Such adjustments may be required in the factory during manufacture, to insure that all or certain groups of units offer the same operating characteristics, or they may be required at the customer's plant or in the field to develop compatibility with unique localized environmental conditions. It has been found that photoelectric controller responses may be governed within satisfactory limits for these purposes through use of movable shutters or filters which regulate the illumination reaching the photocells. Preferably, these masking elements are accurately adjustable from outside the sealed protective housings in which the controllers are mounted. Heretofore, the devices used for such adjustable masking have been relatively complicated and costly, have required relatively large space to accommodate their ranges of movement, and have been adjustable at positions which were not optimum from the standpoints of convenience and structural nicety. In accordance with the present teachings, however, highly miniaturized photoelectric controllers may advantageously be regulated by internal angularly-movable masking elements which occupy very little space, which are of remarkably simple and inexpensive construction, and which are readily assembled and adjusted.

It is one of the objects of this invention, therefore, to provide novel and improved angularly-adjustable optical masking in photoelectric controllers and the like.

Another object is to provide unique shutter mechanisms, for the light-admitting apertures of photoelectric controllers, which are of low-cost uncomplicated construction and are easily and accurately assembled and adjusted.

A further object is to provide a simple one-piece light shutter mechanism, for photoelectric controllers, into which are incorporated certain flexure and self-locking features which facilitate assembly and adjustments.

By way of a summary account of practice of this invention in one of its aspects, a photocell and relay combination is mounted on one side of a circular base having electrical plug-in connector terminals projecting from the opposite side, and a relatively shallow cup-shaped dome is applied in tight covering relationship to the assembly. At one angular position about its periphery, the otherwise opaque dome includes a light-transmitting window through which ambient external illumination may reach the photocell, and, in internal nearby concentric relationship with the dome, there is disposed a thin molded-plastic light shutter member which serves as a mask for the window. The shutter member is integral with and carried by a radially-extending support arm which is flexible in directions normal to the base and which merges with a specially-shaped and slotted central pivot member snap-fitted and self-locked within a central opening in the base and accessible for angular adjustment by a screwdriver or other suitable tool from below the base. As locked in place, the one-piece shutter assembly involves flexure of the flexible support arm, such that frictional engagement or detenting with the base will tend to preserve the shutter in angular masking positions to which it may be set.

Although the aspects of this invention which are believed to be novel are set forth in the appended claims, additional details as to preferred practices and as to the further objects, advantages and features thereof may be most readily comprehended through reference to the following description taken in connection with the accompanying drawings, wherein:

FIGURE 1 is a pictorial view of a small-size photoelectric controller incorporating an improved angularly-adjustable shutter, with portions being broken away to expose internal structural details;

FIGURE 2 provides a cross-section of the controller taken along section line 2—2 of FIGURE 1;

FIGURE 3 portrays the one-piece shutter unit employed in the controller of FIGURES 1 and 2, in an enlarged end view;

FIGURE 4 is a longitudinal cross-section of the improved shutter of FIGURE 3, together with a portion of the base of the controller into which it is locked; and FIGURE 5 illustrates the cooperating elements of FIGURE 4 as they are being locked together.

The plug-in photoelectric device 6 appearing in FIGURES 1 and 2 includes a circular baseplate 7 upon one side of which the controller circuit components are mounted, the generally cup-shaped skirted dome 8 serving to enclose and protect the components. Electrical connectors 9a–9c are arrayed near the center and project downwardly through the moulded plastic baseplate to establish excitation and control interconnections with streetlighting circuitry, for example. Photoconductive cell 10 (such as a cadmium sulfide cell) and the associated electrical relay 11 (FIGURE 2) comprise the principal circuit components of the illustrated simple form of controller. Ambient external illumination may impinge upon the face 10a of cell 10 only through a relatively small window 12 in the cylindrical side wall 8a of the otherwise opaque dome or cover 8. The angular expanse 12a of the window is relatively small and permits the device to be oriented for responses to illumination originating primarily in one directional relationship to the unit; conveniently, this window is merely an uncoated portion of a light-transmitting plastic dome which has been painted or otherwise coated on its interior to render it substantially opaque.

The size of the window 12 which is selected as a standard for manufacture of a particular line of controllers is at least as large as the maximum which will be required under the most extreme conditions, considering both the conditions of ambient environmental illumination and of tolerances in electrical characteristics of the circuit components used. Thus, the window may be adjustably masked in a compensatory manner, by an opaque shutter 13, to regulate the operating characteristics of each controller and bring its responses within desired limits. The shutter is shown in the preferred form of a thin cylindrically-curved member of an arcuate expanse just slightly greater than that of the window 12; the curvature of dome side wall 8a and of the shutter member 13 are substantially the same and the latter is disposed for limited angular movements in proximate concentric relationship with the interior of the dome, about the central axis 14—14.

Arcuate shutter member 13 is preferably an integral part of a one-piece molded plastic (such as black nylon) assembly further including a radically-extending blade element 13a and a central hub 13b. Blade element 13a, which is reinforced somewhat by radially-extending ribs 13c and 13d, is flexible in the vertical directions, i.e. directions normal to the baseplate, for purposes referred to hereinafter. Hub 13b includes a depending cylindrical pivot element 13e having an enlarged tapered end 13f, and is deeply relieved by a pair of mutually-perpendicular slots 13g and 13h (FIGURES 3 and 4) which render it radially compressible for snap-fitting into a central opening 15 in baseplate 7. The lower edge 13i of shutter member 13 is serrated fully along its length, and cooperates with a shallow projection or detent 16 on the top of baseplate 7 to lock the shutter member against accidental displacements from angular positions to which it may be set. The normal outer diameter of pivot element 13e is just slightly less than the diameter of central baseplate opening 15, such that relative angular movement about axis 14—14 is possible when a screwdriver or other suitable tool is inserted into the slotted end of the pivot element and is turned to set the shutter position.

In assembling the shutter unit with the baseplate, the enlarged end 13f of the pivot element is aligned with the baseplate opening 15 and is pressed downwardly such that the parts will fit together in the manner illustrated in FIGURE 5. Deep slots 13g and 13h are partly closed at such times, permitting the slightly enlarged tapered end 13f to fit and slide downwardly within opening 15. In the fully-mated relationship, shown in FIGURE 4, the resilient plastic material of which the shutter unit is molded has caused the slotted pivot element 13e to expand once again to its normal diameter, and the enlarged end 13f thereafter prevents the unit from being accidentaly dislodged from that mated relationship. When the parts are mated and snap-locked in this manner, the blade element 13a is flexed upwardly from its relaxed level 13j, marked in FIGURE 4, inasmuch as the depending lower edge 13i of the shutter then engages the top of the baseplate (via the detent 16) and is thrust upwardly to a small extent. This engagement develops an angular locking action, which may be overcome by forceful turning of the pivot. The axial length of pivot element 13e is substantially the same as that of the baseplate opening 15 into which it is fitted such that there is essentially no axial play permitted between the mated parts; this, and the fact that pivot element 13e is well fitted radially within the baseplate opening, insures that contaminants will not readily enter the covered controller. Baseplate projection 16 and the cooperating serrations in the lower edge 13i of the shutter member are shallow enough to permit their holding tendencies to be overcome when a tool is inserted into the slotted end 13f of the pivot arrangement and a turning torque is applied. Flexures of radial portions 13a accommodate the re-orientations of the shutter unit as it is turned angularly. Components, such as the photocell 10 and relay 11 (FIGURE 2) are readily mounted on the baseplate at positions where they do not mechanically interfere with movements of the relatively narow shutter portion 13a near the top surfaces of the baseplate.

Those skilled in the art will recognize that the shutter unit may, in an alternative construction, comprise more than a single integral molded part, and that it may cooperate with a controller including cells, relays and other components which are specifically different from and in circuit relationships which are different from those selected for illustration and discussion. Advantageously, the pivoting is centralized and setting adjustments can be made centrally of the base, although other arrangements may also be devised. It will further be perceived that the shutter member need not be entirely opaque, but may be partly translucent or may include perforations or alternate light-transmissing and light-interrupting portions, or may have filter characteristics. Most commonly, the contour of the shutter member will correspond to that of the interior of the window which it masks; however, it may also be shaped for optimum masking of a particular photocell or phototube opening in alternative designs wherein the masking is best performed other than at a window of a cover.

Accordingly, it should be understood that the embodiments and practices described and portrayed have been presented by way of disclosure, rather than limitation, and that various modifications, substitutions and combinations may be effected without departure from the spirit and scope of this invention in its broader aspects.

I claim:

1. Photoelectric control apparatus comprising first and second members mated together to form a light-shielding protective enclosure for control circuit elements including a light-responsive device and electrical relay, said enclosure having a relatively small light-transmitting portion therethrough at one position, and a shutter mechanism including a light masking member disposed within said enclosure in proximity with the light-transmitting portion thereof, a pivot member mounted for angular movements about an axis on one of said members, means securing said light masking member with said pivot member for angular movements therewith about said axis, and means frictionally restraining angular movements of said masking member in relation to said enclosure, said mechanism including means projecting through said enclosure and angularly movable from outside said enclosure to apply turning torques to said mechanism about said axis, whereby turning of said mechanism against restraint of said restraining means is effective to adjust the positions of said masking member in relation to said light-transmitting portion of said enclosure and to regulate the light reaching said light-responsive device.

2. Photoelectric control apparatus comprising a base having control circuit elements including a light-responsive device and electrical relay mounted thereon, a light-shielding housing fitted with said base and protectively enclosing said circuit elements, said housing having a relatively small light-transmitting portion therethrough at one position, and a shutter mechanism including a light masking member disposed within said housing in proximity with the light-transmitting portion of said housing, a pivot member projecting through an opening in said base and rotatable therein, said pivot member having an end projecting through said base which is shaped to receive a tool and accept turning torques therefrom, means securing said light masking member with said pivot member for angular movements therewith, and means frictionally restraining angular movements of said masking member, whereby turning of said shaped projecting end of said pivot member against restraint of said restraining means is effective to adjust the positions of said masking member in relation to said light-transmitting portion of said housing and to regulate the light reaching said light-responsive device from outside said housing.

3. Photoelectric control apparatus as set forth in claim 2 wherein said light masking member, said pivot member, and said means securing said masking member with said pivot member are integral with one another and thereby form a one-piece unit, and wherein said pivot member is radially compressible and is larger at both ends than an accommodating opening through said base, whereby said pivot member is self-locking in said base when mated therewith through the opening therein.

4. Photoelectric control apparatus as set forth in claim 2 wherein said light-transmitting portion of said housing is at a predetermined radial distance from the longitudinal axis of the opening in said base and of said pivot member therein, wherein said masking member is of a configuration complementing that of said light-transmitting portion of said housing, wherein said means securing said masking member with said pivot member extends radially from said axis to said masking member and is flexible in directions parallel to said axis, and wherein said restraining means comprises cooperating detent means on said base and said shutter mechanism the restraining effects of which are temporarily overcome upon flexure of said flexible securing means when said pivot member is rotated.

5. Photoelectric control apparatus comprising a substantially circular base having control circuit elements including a light-responsive cell and electrical relay mounted thereon around a substantially central opening therethrough, a light-shielding cup-shaped dome fitted over said base and protectively enclosing said circuit elements, said dome having a relatively small light-transmitting portion therethrough at one position along a substantially cylindrical side wall thereof, and a shutter mechanism within said dome including a light-masking member having a substantially cylindrical curvature complementing that of said side wall of said dome, a pivot member projecting through the opening in said base and angularly movable therein, said pivot member having an end projecting through said base which is shaped to receive a tool and accept turning torques therefrom, means interconnecting said light masking members with said pivot member for angular movements therewith at a predetermined radial distance therefrom and in proximity with said light-transmitting portion of said side wall, and detent means frictionally restraining angular movements of said masking member in relation to said base, whereby turning of said shaped projecting end of said pivot member against restraint of said detent means is effective to adjust the angular positions of said masking member in relation to said light-transmitting portion of said dome and to regulate the light reaching said cell from outside said dome.

6. Photoelectric control apparatus as set forth in claim 5 wherein said light-masking member, said pivot member, and said interconnecting means are integral with one another and comprise a one-piece molded plastic shutter unit.

7. Photoelectric control apparatus as set forth in claim 6 wherein said projecting end of said pivot member includes a substantially cylindrical portion and enlarged end portions of diameter greater than that of the central opening in said base, said end projecting through said base being diametrically slotted and thus being radially compressible to permit said pivot member to be inserted into the opening in said base, and the length of said cylindrical portion being substantially the same as that of the opening in said base, whereby said pivot member is self-locking and maintains said shutter unit in a predetermined orientation relative to said base and dome.

8. Photoelectric control apparatus as set forth in claim 6 wherein said shutter unit is molded of resilient plastic and said radial interconnecting means between the light-masking member and said pivot means is substantially flat in a plane normal to the turning axis of said pivot member and is thus substantially rigid in directions of angular turning thereof and is flexible in directions substantially parallel with said axis, and wherein portions of said base and said shutter unit, respectively, are pressed into engagement with one another with attendant flexure of said flexible radial interconnecting means when said pivot is mated and locked with said base through the opening therein.

9. Photoelectric control apparatus as set forth in claim 8 wherin one of said portions of said base and shutter unit includes a serrated ridge, and the other of said portions includes at least one projection engaging said serrated ridge as a detent.

10. Photoelectric control apparatus as set forth in claim 9 wherein said serrated ridge is formed along an edge of said light-masking member disposed in abutting relationship to one side of said base.

No references cited.

RALPH G. NILSON, *Primary Examiner.*

T. N. GRIGSBY, *Assistant Examiner.*